(12) United States Patent
Assem Aly Salama et al.

(10) Patent No.: US 9,961,165 B2
(45) Date of Patent: *May 1, 2018

(54) QUALITY OF EXPERIENCE FOR COMMUNICATION SESSIONS

(71) Applicant: International Business Machines Corporation, Armonk, NY (US)

(72) Inventors: Hitham Ahmed Assem Aly Salama, Blanchardstown (IE); Jonathan Dunne, Dungarvan (IE); James P. Galvin, Jr., Georgetown, KY (US); Patrick J. O'Sullivan, Ballsbridge (IE)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/965,950

(22) Filed: Dec. 11, 2015

(65) Prior Publication Data
US 2016/0165009 A1    Jun. 9, 2016

Related U.S. Application Data

(63) Continuation of application No. 14/560,019, filed on Dec. 4, 2014.

(51) Int. Cl.
*H04L 29/08* (2006.01)
*H04L 29/06* (2006.01)
(Continued)

(52) U.S. Cl.
CPC .......... *H04L 67/322* (2013.01); *H04L 47/24* (2013.01); *H04L 65/403* (2013.01); *H04L 65/80* (2013.01);
(Continued)

(58) Field of Classification Search
CPC ....... H04L 67/00–67/322; H04L 63/00–43/10; H04L 65/1066–65/4053;
(Continued)

(56) References Cited

U.S. PATENT DOCUMENTS

| | | | |
|---|---|---|---|
| 8,385,526 | B2 | 2/2013 | Smelyansky et al. |
| 8,433,755 | B2 | 4/2013 | Garcia, Jr. et al. |

(Continued)

FOREIGN PATENT DOCUMENTS

WO    2004006475 A2    1/2004

OTHER PUBLICATIONS

Anonymous Author, "System and Method for Guiding Optimal Codec usage in Mult-Party UT Calls," ip.com, IP.Com No. IPCOM000220638D, Published Aug. 9, 2012, pp. 1-3.
(Continued)

*Primary Examiner* — Clayton R Williams
(74) *Attorney, Agent, or Firm* — Brian J. Colandreo, Esq.; Jeffrey T. Placker, Esq.; Holland & Knight, LLP

(57) ABSTRACT

A computer-implemented method, computer program product, and computing system is provided for managing quality of experience for communication sessions. In an implementation, a method may include determining a participant focus metric for each of a plurality of participants of a communication session. The method may also include identifying one of the plurality of participants of the communication session as having sufficient capacity to support the communication session based upon, at least in part, the participant focus metric for each of the plurality of participants of the communication session. The method may also include selecting the one of the plurality of participants having a sufficient capacity to support the communication session as a selected focus for the communication session. The method may further include adaptively implementing a centralized
(Continued)

communication session architecture utilizing the selected focus.

7 Claims, 10 Drawing Sheets

(51) Int. Cl.
*H04L 12/851* (2013.01)
*H04L 12/24* (2006.01)

(52) U.S. Cl.
CPC ........ *H04L 67/142* (2013.01); *H04L 41/5067* (2013.01)

(58) Field of Classification Search
CPC . H04L 41/5003–41/5067; H04L 47/24–47/26; H04L 65/00–65/80
See application file for complete search history.

(56) References Cited

U.S. PATENT DOCUMENTS

| | | | |
|---|---|---|---|
| 8,503,650 B2 | 8/2013 | Reding et al. | |
| 2005/0210517 A1* | 9/2005 | Hirose | H04L 41/22 725/81 |
| 2007/0162939 A1* | 7/2007 | Bennett | H04N 5/4403 725/74 |
| 2010/0177880 A1 | 7/2010 | Danielsen | |
| 2012/0169836 A1* | 7/2012 | Setlur | H04L 12/1827 348/14.11 |
| 2014/0002584 A1* | 1/2014 | Moon | H04L 12/1818 348/14.08 |
| 2015/0350602 A1 | 12/2015 | Assem Aly Salama et al. | |
| 2015/0350603 A1 | 12/2015 | Assem Aly Salama et al. | |

OTHER PUBLICATIONS

IBM List of Patents or Patent Applications to be Treated as Related (for Examiner Information only) dated Dec. 11, 2015, pp. 1-2.

Assem et al., U.S. Appl. No. 14/290,213, May 29, 2014, "Adaptive Video Streaming for Communication Sessions,", Examiner availabilty only, pp. 1-41 including figures.

* cited by examiner

QUALITY OF EXPERIENCE FOR COMMUNICATION SESSIONS

RELATED APPLICATIONS

The subject application is a continuation application of U.S. patent application with Ser. No. 14/560,019, filed on Dec. 4, 2014, the entire content of which is herein incorporated by reference.

TECHNICAL FIELD

The present disclosure generally relates to systems and method for electronic communications, and more particularly relates to managing quality of experience for electronic communication sessions.

BACKGROUND

Various collaboration systems exist for enabling individuals to engage in collaborate activities, such as working together on projects, sharing information, and the like. Collaboration systems can be particularly useful in allowing geographically dispersed individuals to interact and work with one another. Using various different collaboration systems, or multi-functional collaboration systems, individuals who are geographically remote from one another may, for example, engage in common work projects, for example, using online team work spaces, participate in interactive discussions, for example, using teleconferencing or video conferencing systems, and engage in meetings, for example, using electronic meeting systems that allow for presentations, lectures, seminars, and the like.

SUMMARY OF DISCLOSURE

According to an implementation, a computer-implemented method may include determining, by a computing device, a participant focus metric for each of a plurality of participants of a communication session. The method may also include identifying one of the plurality of participants of the communication session as having sufficient capacity to support the communication session based upon, at least in part, the participant focus metric for each of the plurality of participants of the communication session. The method may also include selecting the one of the plurality of participants having a sufficient capacity to support the communication session as a selected focus for the communication session. The method may further include adaptively implementing a centralized communication session architecture utilizing the selected focus.

One or more of the following features may be included. Network conditions and hardware capacities associated with each of the plurality of participants of the communication session may be analyzed. The participant focus metric may be determined for each of the plurality of participants based upon, at least in part, the network conditions and hardware capacities associated with each of the plurality of participants of the communication session. Identifying one of the plurality of participants of the communication session as having a sufficient capacity to support the communication session may include identifying one of the plurality of participants as having a participant focus metric greater than a threshold participant focus metric.

Determining the participant focus metric includes periodically determining the participant focus metric for each of the plurality of participants. The method may include identifying a change in a network characteristic associated with one or more of the plurality of participants. The participant focus metric for each of the plurality of participants may be determined based upon, at least in part, the change in the network characteristic associated with the one or more of the plurality of participants. The method may include identifying a change in hardware capacity associated with one or more of the plurality of participants. The participant focus metric may be determined for each of the plurality of participants based upon, at least in part, the change in hardware capacity associated with the one or more of the plurality of participants.

The method may include determining a changed participant focus metric associated with the selected focus. The communication session may be adaptively switched to a different participant of the communication session as a new selected focus for implementing the centralized communication session architecture for the communication session.

According to another implementation, a computer program product may include a non-transitory computer readable storage medium having a plurality of instructions stored on it. When executed by a processor, the instructions may cause the processor to perform operations including determining a participant focus metric for each of a plurality of participants of a communication session. Instructions may also be included for identifying one of the plurality of participants of the communication session as having sufficient capacity to support the communication session based upon, at least in part, the participant focus metric for each of the plurality of participants of the communication session. Instructions may also be included for selecting the one of the plurality of participants having a sufficient capacity to support the communication session as a selected focus for the communication session. Instructions may further be included for adaptively implementing a centralized communication session architecture utilizing the selected focus.

One or more of the following features may be included. Instructions may be included for analyzing network conditions and hardware capacities associated with each of the plurality of participants of the communication session. The participant focus metric may be determined for each of the plurality of participants based upon, at least in part, the network conditions and hardware capacities associated with each of the plurality of participants of the communication session. Identifying one of the plurality of participants of the communication session as having a sufficient capacity to support the communication session may include identifying one of the plurality of participants as having a participant focus metric greater than a threshold participant focus metric.

The instructions for determining the participant focus metric may include instructions for periodically determining the participant focus metric for each of the plurality of participants. A change in a network characteristic associated with one or more of the plurality of participants may be identified. The participant focus metric for each of the plurality of participants may be determined based upon, at least in part, the change in the network characteristic associated with the one or more of the plurality of participants. A change in hardware capacity associated with one or more of the plurality of participants may be identified. The participant focus metric for each of the plurality of participants may be determined based upon, at least in part, the change in hardware capacity associated with the one or more of the plurality of participants.

Instructions may be included for determining a changed participant focus metric associated with the selected focus.

The communication session may be adaptively switched to a different participant of the communication session as a new selected focus for implementing the centralized communication session architecture for the communication session.

According to yet another implementation, a computing system may include a processor and a memory module coupled with the processor. The processor may be configured for determining a participant focus metric for each of a plurality of participants of a communication session. The processor may also be configured for identifying one of the plurality of participants of the communication session as having sufficient capacity to support the communication session based upon, at least in part, the participant focus metric for each of the plurality of participants of the communication session. The processor may also be configured for selecting the one of the plurality of participants having a sufficient capacity to support the communication session as a selected focus for the communication session. The processor may be further configured for adaptively implementing a centralized communication session architecture utilizing the selected focus.

One or more of the following features may be included. The processor may be further configured for analyzing network conditions and hardware capacities associated with each of the plurality of participants of the communication session. The processor may also be configured for determining the participant focus metric for each of the plurality of participants based upon, at least in part, the network conditions and hardware capacities associated with each of the plurality of participants of the communication session. Determining the participant focus metric may include periodically determining the participant focus metric for each of the plurality of participants.

The processor may be further configured for identifying a change in a network characteristic associated with one or more of the plurality of participants. The processor may also be configured for determining the participant focus metric based upon, at least in part, the change in the network characteristic associated with the one or more of the plurality of participants. The processor may be further configured for identifying a change in hardware capacity associated with one or more of the plurality of participants. The processor may also be configured for determining the participant focus metric based upon, at least in part, the change in hardware capacity associated with the one or more of the plurality of participants.

The processor may be further configured for determining a changed participant focus metric associated with the selected focus. The processor may also be configured for adaptively switching to a different participant of the communication session as a new selected focus for implementing the centralized communication session architecture for the communication session.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION

Figure 1:
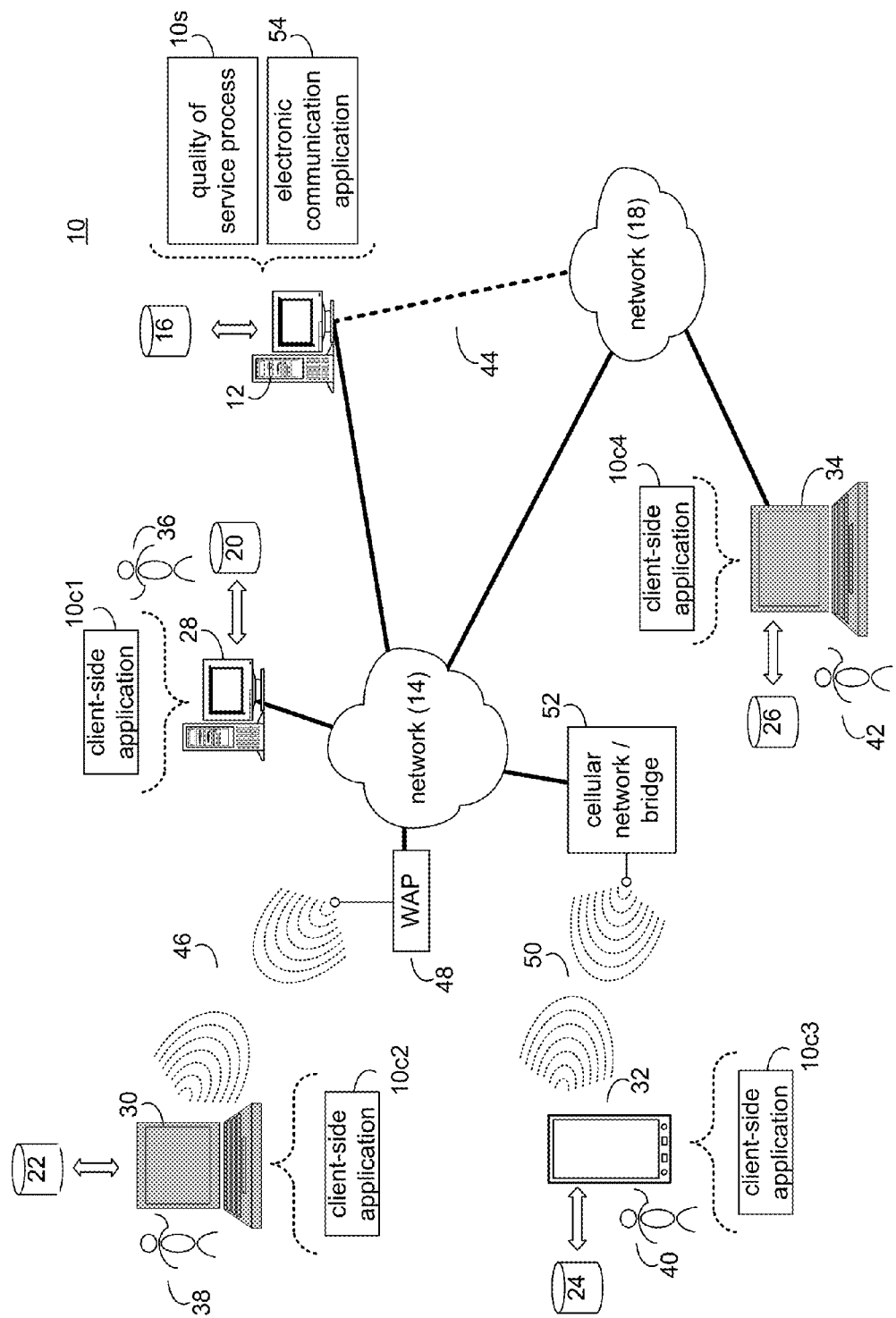
FIG. 1 is a diagrammatic view of a distributed computing network including a computing device that executes a quality of experience process according to an implementation of the present disclosure.

Individuals may often engage in communication sessions, or video conferences, utilizing a data network for conveying the communications. Such communication sessions may include conference calls, video conferences, Voice-over-IP communications, multimedia conferences and Video-over-IP communications, in which the communications to and from each party may be conveyed as packetized data over a data network. The quality of these types of communications can be greatly effected by network conditions. For example, available bandwidth, delay, packet loss, jitter, burst ratio may be important factors that may impact the perceived quality of experience of the individuals participating in a video conference. Consistent with an embodiment of the present disclosure, adaptive selection of a participant to provide the role of the focus for the communication session may be utilized to provide a satisfactory and/or best available quality of experience for the participants of the communication session. The adaptive selection of the participant to provide the role as the focus for the communication session may allow the participant providing the role of the focus for the communication session to change over the course of the communication session, for example, when utilizing a different user as the focus for the communication session may provide a better quality of experience.

In some embodiments, a participant focus metric may be determined for each of the participants of the communication session. The participant focus metric may generally indicate the capacity of each participant to serve as the focus for the communication session. For example, the participant focus metric may provide at least a general indication of an expected quality of experience that may be achieved for each participant acting in the role of the focus for the communication session.

In an embodiment, the participant focus metric may generally be based upon, at least in part, one or more of the network conditions or characteristics experienced by each participant of the communication session and the hardware capacities of each participant of the communication session. As such, the network conditions and hardware capacities of each participant of the communication session may be analyzed. One or more participants may be identified as having a sufficient capacity to act as the focus for the communication session, e.g., based upon, at least in part, the participant focus metric associated with each participant. One of the participants having a sufficient capacity to support the communication session may be selected as the focus for the communication session. A centralized communication session architecture may be implemented utilizing the selected participant as the focus for the communication session. As network characteristics and/or hardware capacities associated with the participants change through the course of the communication session, a new participant may be selected as the focus for the communication session. For example, it may be determined that utilizing the new participant as the focus for the communication session may provide improved quality of experience for the communication session. The communication session may be adaptively switched to utilize the new participant as the focus for the communication session.

Referring to FIG. 1, there is shown quality of experience process 10. For the following discussion, it is intended to be understood that quality of experience process 10 may be implemented in a variety of ways. For example, quality of experience process 10 may be implemented as a server-side process, a client-side process, or a server-side/client-side process.

For example, quality of experience process 10 may be implemented as a purely server-side process via quality of experience process 10s. Alternatively, quality of experience process 10 may be implemented as a purely client-side process via one or more of client-side application 10c1, client-side application 10c2, client-side application 10c3, and client-side application 10c4. Alternatively still, quality of experience process 10 may be implemented as a server-side/client-side process via server-side quality of experience process 10s in combination with one or more of client-side application 10c1, client-side application 10c2, client-side application 10c3, and client-side application 10c4. In such an example, at least a portion of the functionality of quality of experience process 10 may be performed by quality of experience process 10s and at least a portion of the functionality of quality of experience process 10 may be performed by one or more of client-side application 10c1, 10c2, 10c3, and 10c3.

Accordingly, quality of experience process 10 as used in this disclosure may include any combination of quality of experience process 10s, client-side application 10c1, client-side application 10c2, client-side application 10c3, and client-side application 10c4.

Figure 2:
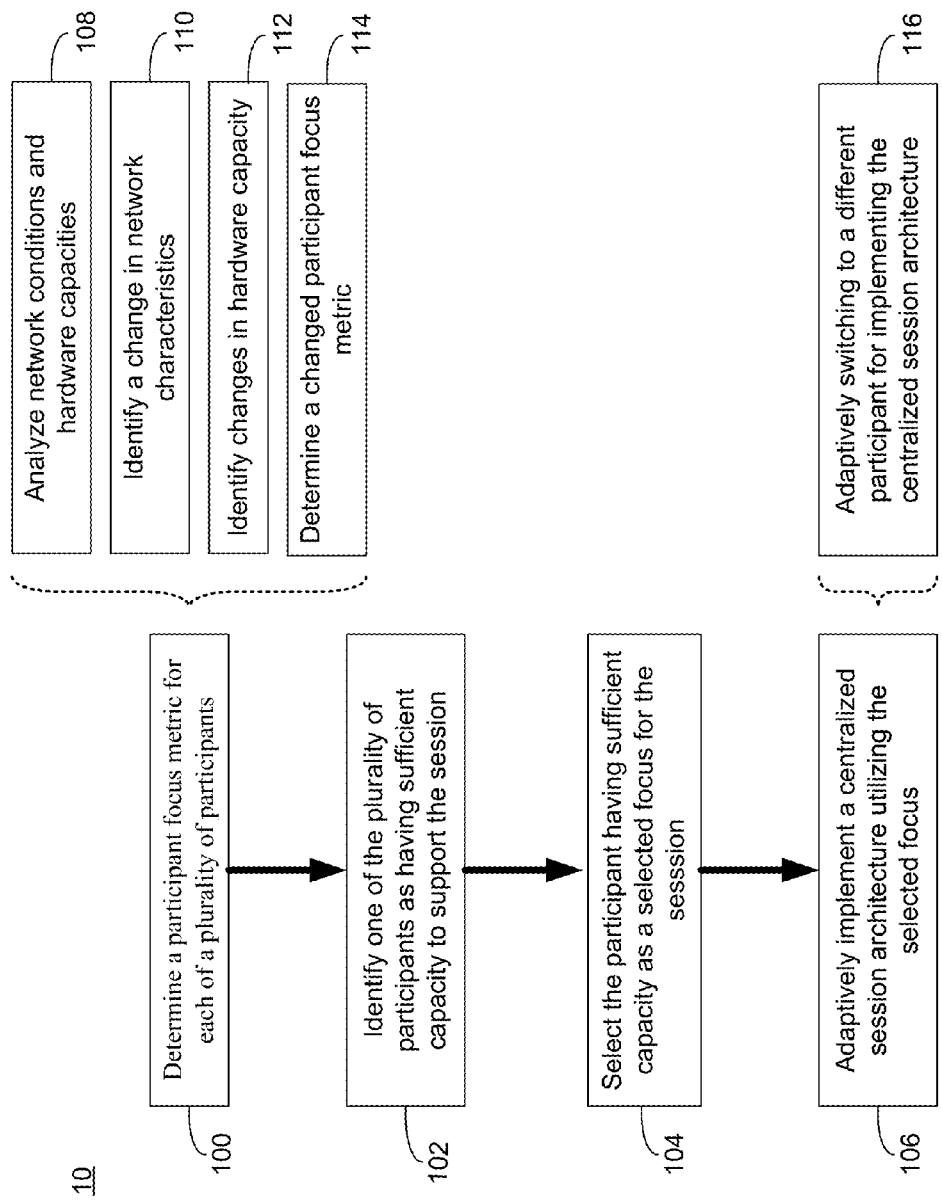
FIG. 2 is a flowchart of the quality of experience process of FIG. 1, according to an implementation of the present disclosure.

Referring also to FIG. 2, and as will be discussed in greater detail below, quality of experience process 10 may generally determine 100 a participant focus metric for each of a plurality of participants of a communication session. Quality of experience process 10 may also identify 102 one of the plurality of participants of the communication session as having sufficient capacity to support the communication session based upon, at least in part, the participant focus metric for each of the plurality of participants of the communication session. Quality of experience process 10 may also select 104 the one of the plurality of participants having a sufficient capacity to support the communication session as a selected focus for the communication session. Quality of experience process 10 may further adaptively implement 106 a centralized communication session architecture utilizing the selected focus.

Quality of experience process 10s may be a server application and may reside on and may be executed by computing device 12, which may be connected to network 14 (e.g., the Internet or a local area network). Examples of computing device 12 may include, but are not limited to: a personal computer, a server computer, a series of server computers, a mini computer, a mainframe computer, or a dedicated network device.

The instruction sets and subroutines of quality of experience process 10s, which may be stored on storage device 16 coupled to computing device 12, may be executed by one or more processors (not shown) and one or more memory architectures (not shown) included within computing device 12. Examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Examples of client-side applications 10c1, 10c2, 10c3, 10c4 may include but are not limited to, one or more of a voice-over-IP application, a video-over-IP application, a web browser, or a specialized application (e.g., an application running on a mobile platform). The instruction sets and subroutines of client-side application 10c1, 10c2, 10c3, 10c4, which may be stored on storage devices 20, 22, 24, 26 (respectively) coupled to client electronic devices 28, 30, 32, 34 (respectively), may be executed by one or more processors (not shown) and one or more memory architectures (not shown) incorporated into client electronic devices 28, 30, 32, 34 (respectively). Examples of storage devices 20, 22, 24, 26 may include but are not limited to: hard disk drives; tape drives; optical drives; RAID devices; random access memories (RAM); read-only memories (ROM), and all forms of flash memory storage devices.

Examples of client electronic devices 28, 30, 32, 34 may include, but are not limited to, personal computer 28, laptop computer 30, mobile computing device 32, notebook computer 34, a netbook computer (not shown), a server computer (not shown), a gaming console (not shown), a data-enabled television console (not shown), and a dedicated network device (not shown). Client electronic devices 28, 30, 32, 34 may each execute an operating system.

Users 36, 38, 40, 42 may access quality of experience process 10 directly through network 14 or through secondary network 18. Further, quality of experience process 10 may be accessed through secondary network 18 via link line 44.

The various client electronic devices (e.g., client electronic devices 28, 30, 32, 34) may be directly or indirectly coupled to network 14 (or network 18). For example, personal computer 28 is shown directly coupled to network 14. Further, laptop computer 30 is shown wirelessly coupled to network 14 via wireless communication channels 46 established between laptop computer 30 and wireless access point (WAP) 48. Similarly, mobile computing device 32 is shown wirelessly coupled to network 14 via wireless communication channel 50 established between mobile computing device 32 and cellular network/bridge 52, which is shown directly coupled to network 14. WAP 48 may be, for example, an IEEE 802.11a, 802.11b, 802.11g, 802.11n, Wi-Fi, and/or Bluetooth device that is capable of establishing wireless communication channel 46 between laptop computer 30 and WAP 48. Additionally, personal computer 34 is shown directly coupled to network 18 via a hardwired network connection.

In some embodiments, quality of experience process 10 may communicate with, interact with, and/or include a component or module of a communication application (e.g., communication application 54). As is generally known, a communication application (e.g., communication application 54) may generally facilitate electronic communication sessions, such as voice communications, multi-media communications, video communications or conferences, etc., between individuals as participants in a communication session. For example, communication application 54 may facilitate voice over IP and/or video over IP communications between communication session participants. In some embodiments, a communication session may only include two participants. In some embodiments, a communication session may include more than two participants. In some embodiments, communication application 54 may include, and/or may interact with, for example, an electronic meeting application, a web conferencing application, or a similar application. An example of communication application 54 may include, but is not limited to, IBM® Sametime®. (IBM and Sametime are registered trademarks of International Business Machine Corporation in the United States, other countries, or both). In some embodiments, communication application 54 may include a communication gateway and/or provide functionality of a communication gateway.

In an embodiment, the instruction sets and subroutines of electronic communication application 54 may be stored, e.g., on storage device 16 associated with server computer 12, which executes electronic communication application 54, and/or another suitable storage device. Further, users (e.g., one or more of users 36, 38, 40, 42) may access electronic communication application 54 in order to participate in a communication session (such as a voice call, a video call, an electronic meeting, or other communication session type). The users may access electronic communication application 54 via one or more suitable applications, such as client side applications 10c1-10c4 (e.g., which may include a voice-over-IP application, a video-over-IP application, a web browser, a client electronic meeting application, or another application) and/or via a different application (not shown). Additionally, while some users are depicted as being connected with server computer 12 (and therefore with electronic communication application 54) via network 14, which may include the Internet, in other embodiments, one or more users may be directed connected to server computer 12 and/or connected with server computer 12 via, e.g., a local area network and/or similar connection.

As generally discussed above, a portion and/or all of the functionality of quality of experience process 10 may be provided by one or more of client side applications 10c1-10c4. For example, in some embodiments quality of experience process 10 (and/or client-side functionality of quality of experience process 10) may be included within and/or interactive with client-side applications 10c1-10c4, which may include client side electronic communication applications, web browsers, or another application. Various additional/alternative configurations may be equally utilized.

As generally discussed above with reference to FIG. 2, quality of experience process 10 may generally determine 100 a participant focus metric for each of a plurality of participants of a communication session. Quality of experience process 10 may also identify 102 one of the plurality of participants of the communication session as having sufficient capacity to support the communication session based upon, at least in part, the participant focus metric for each of the plurality of participants of the communication session. Quality of experience process 10 may also select 104 the one of the plurality of participants having a sufficient capacity to support the communication session as a selected focus for the communication session. Quality of experience process 10 may further adaptively implement 106 a centralized communication session architecture utilizing the selected focus.

Figure 3:
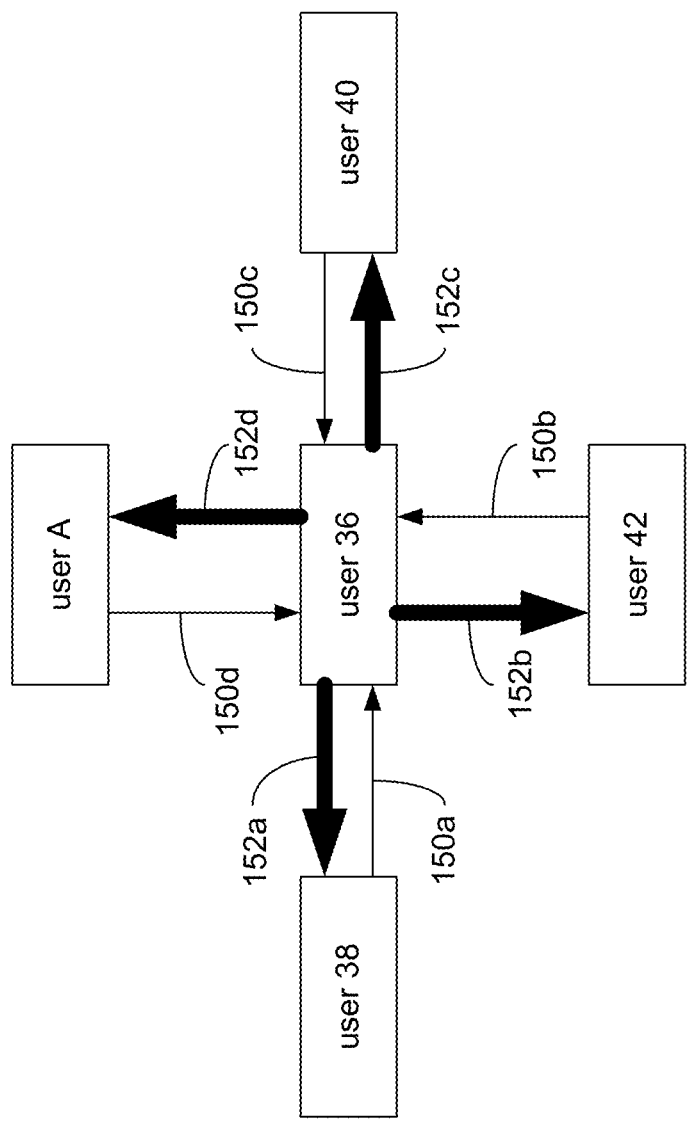
FIG. 3 diagrammatically depicts a communication session architecture arrangement provided by the quality of experience process of FIG. 1, according to an example embodiment.

For example, and referring also to FIG. 3, a multi-party communication session, such as a conference call, a video conference, or another type of multi-party communication session may include a plurality of participants (e.g., user 36, user 38, user 40, user 42 and user A). As shown, in an example embodiment the communication session may implement a centralized communication session architecture, in which one of the participants of the communication session may act as a central focus for the communication session. With continued reference to FIG. 3, in the illustrated example embodiment a centralized communication session architecture is shown in which user 36 is the focus for the purpose of the communication session. In general the focus (e.g., user 36 in the illustrated example) may receive a media stream (e.g., media streams 150a, 150b, 150c, 150d depicted using thin arrows) transmitted from each of the other participants (e.g., transmitted from computing devices utilized by each of the other participants for the purpose of engaging in the communication session) in the communication session (e.g., user 38, user 40, user 42, and user A, respectively). The media streams (e.g., media streams 150a, 150b, 150c, 150d) may include audio media streams (e.g., in an embodiment in which the communication session may include a conference call), video bit streams (e.g., in an embodiment in which the communication session may include a video conference), and/or may include other suitable media streams. As the focus, user 36 (e.g., computing device 28 utilized by user 36 for the purpose of participating in the communication session) may receive each of the media streams 150a, 150b, 150c, 150d from the other individuals participating in the communication session. Further, as the focus, user 36 may decode each of the media streams received from the other participants of the communication session, and may mix the media streams received from the other participants. Further, as the focus user 36 may encode the mixed media streams and may distribute (e.g., transmit) the mixed media streams (e.g., mixed media streams 152a, 152b, 152c, 152d depicted using bold arrows) to each of the other participants of the communication session. As such, each of the plurality of participants in the communication session may received the mixed media stream for the communication session.

It will be appreciated that actions described as being performed by a participant in the communication session may be performed by a computing device utilized by the participant in the communication session. For example, as described above, user 36, as the focus of the communication session, may received the media streams from the other participants, may decode the media streams, may mix the media streams, may encode the mixed media stream, and may distribute the mixed media stream. It will be appreciated that such actions described as being performed by user 36 may be performed by a computing device utilized by, and/or associated with, user 36, such as computing device 28. Further, it will be appreciated that other actions described as being performed by user 36, and/or by another user or participant, may be performed by a computing device utilized by, and/or associated with, user 36 and/or another user or participant.

Quality of experience process 10 may determine 100 a participant focus metric for each of a plurality of participants of a communication session. The participant focus metric may generally indicate a capability of the participant (i.e., of the computing device utilized by the participant) to perform the operations of the focus. That is, the participant focus metric may generally indicate the capability of each participant to receive media streams from the other participants, decode and mix the media streams from the other participants, encode the mixed media stream, and distribute the mixed media stream to the other participants of the communication session, as well as various other operations that may be performed by the focus of the communication session. The capability of each participant to perform the operations of the focus may be based upon, at least in part, the network conditions associated with each participant, and the hardware capacities associated with each participant of the communication session. Accordingly, in an embodiment quality of experience process 10 may analyze 108 network conditions and hardware capacities associated with each of the plurality of participants of the communication session.

For example, receiving media streams from each of the other participants of the communication session and distributing a mixed media stream to each of the other participants of the communication session may require a certain level of network capacity in order to provide a satisfactory quality of experience for each of the participants of the communication session. Examples of network conditions that may be analyzed 108 for each of the plurality of participants may include, but are not limited to, bandwidth, packet loss, latency, jitter, burst rate, etc. For example, a relatively low bandwidth associated with a participant may limit that participant's ability to receive media stream from each of the other participants and to distribute the mixed media stream to each of the other participants. As such, a participant having relatively low bandwidth may not be able perform the necessary operations of focus for the communication session at a satisfactory quality of experience for the communication session. Various additional/alternative network characteristics may similarly impact the ability of a participant to perform as the focus for the communication session while providing a satisfactory quality of experience for the communication session. Accordingly, quality of experience process 10 may analyze network conditions associated with each of the plurality of participants of the communication session.

Figure 4:
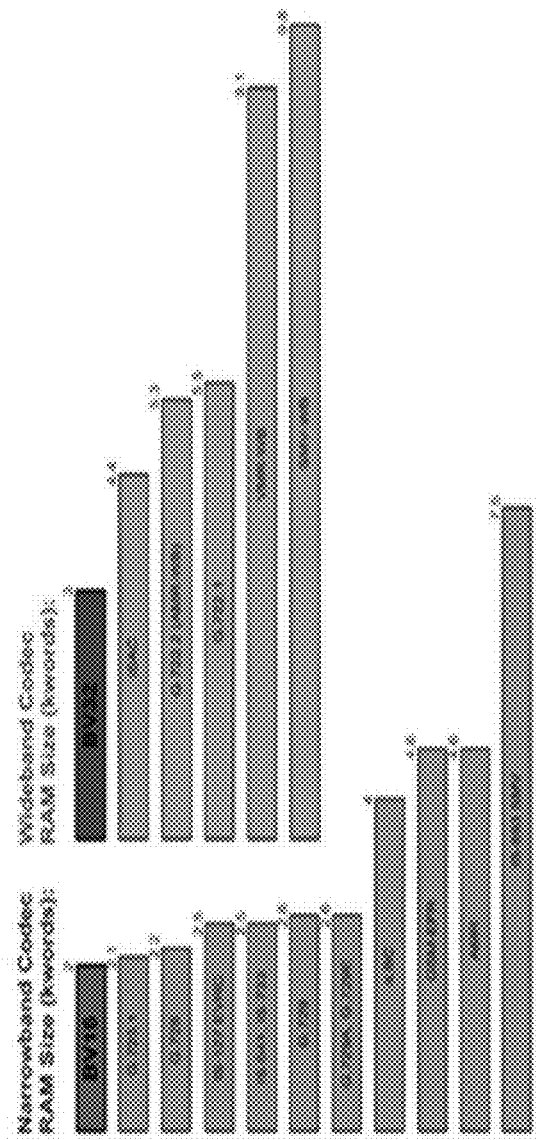
FIG. 4 graphically depicts RAM utilization for example communication codecs, according to an example embodiment.
Figure 5:
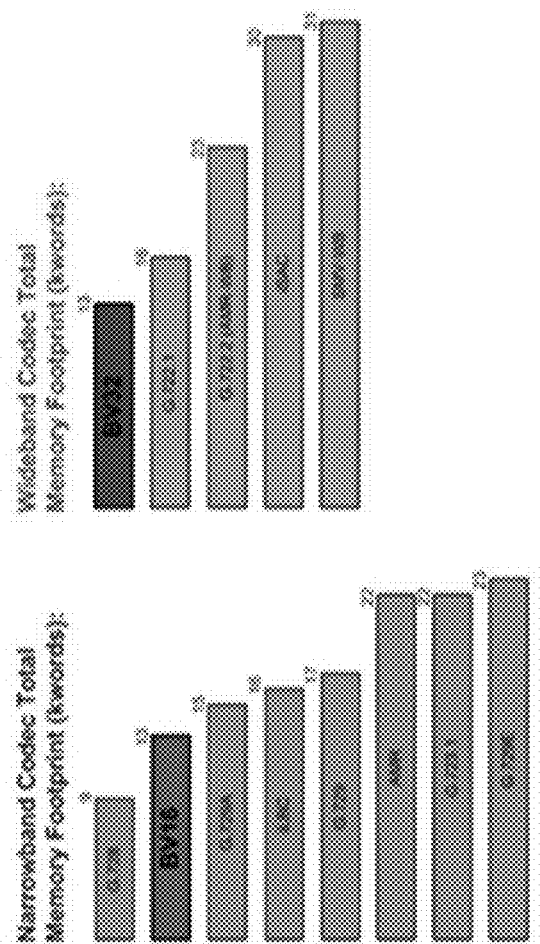
FIG. 5 graphically depicts memory footprint for example communication codecs, according to an example embodiment.
Figure 6:
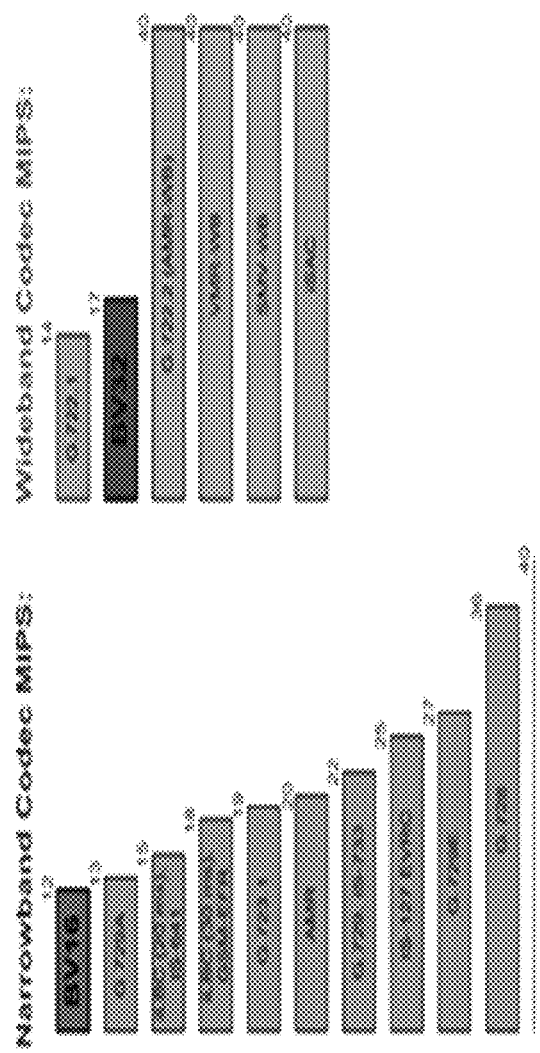
FIG. 6 graphically depicts million instructions per second (MIPS) required for example communication codecs, according to an example embodiment.

In addition to network conditions, hardware capacities associated with each of the plurality of participants of the communication session may impact the ability of each participant to perform as focus for the communication session. For example, receiving media streams from each of the other participants, decoding the media streams from each of the other participants, mixing the media streams from each of the other participants, encoding the mixed media stream, and distributing the mixed media stream to the other participants may require hardware resources. The amount of available hardware resources associated with a particular participant (i.e., associated with the computing device utilized by the participant) may impact the quality of experience for the communication session that the particular participant may be able to provide when acting as the focus for the communication session. For example, and referring to FIGS. 4-6, the complexity of various example codecs (e.g., which may be utilized for encoding media streams for a communication session) are shown in terms of RAM requirements, memory footprint, and millions of instructions per second (MIPS) required for processing media streams associated with a communication session. It will be appreciated that the hardware capacity required for processing the media streams when acting as the focus for the communication session may depend, for example, based upon the number of participants in the communication session, the particular codec utilized for the communication session, etc. In an embodiment, quality of experience process 10 may analyze 108 hardware capacities associated with each of the plurality of participants, including capacities such as available RAM, available processor cycles, network interfaces, etc. The hardware capacities associated with each of the plurality of participants may depend, at least in part, on the hardware attributes (e.g., total RAM, processor speed, network interface speed, etc.) as well as other processes being performed by the computing devices associated with each of the participants concurrently with the communication session. For example, such other processes may require RAM, processor capacity, and network capacity, e.g., which may reduce the available hardware capacities that may be utilized to perform the operations of focus for the communication session.

Quality of experience process 10 may determine 100 the participant focus metric (e.g., also referred to herein as a "participant focus score") may for each of the plurality of participants based upon, at least in part, the network conditions and hardware capacities associated with each of the plurality of participants of the communication session. For example, and as generally discussed above, the participant focus metric may generally provide an indication of the ability of a participant to act as focus for the communication session at a satisfactory quality of experience for the communication session. As such, the participant focus metric associated with each of the plurality of participants may be based on the various network conditions or characteristics and the various hardware capacities associated with each of the plurality of participants (i.e., associated with the respective computing device utilized by each participant). In an embodiment, the various analyzed 108 network conditions or characteristics (e.g., bandwidth, packet loss, jitter, latency, burst ratio, etc.) and each of the hardware capacities (available ram, processor capacity, network interface, etc.) may be weighted. In an embodiment, the weighing factor may be based upon, at least in part, an anticipated contribution that each criterion may have toward achieving (or not achieving) a satisfactory quality of experience.

In an example embodiment, the participant focus metric may be a function of the MIPS required for processing the utilized codec as the focus, the RAM memory requirement for processing the utilized codec as the focus, the total memory required for an example 16-bit fixed-point commercial digital signal processor, and of the network conditions associated with the participant. In some embodiments, a participant focus metric function may be specific to each individual codec. As such, the participant focus metric function utilized may vary depending upon the codec utilized for the communication session. For example, different participant focus metric functions may include different weighting factors associated with the various considered criteria, and/or different participant focus metric functions may consider different criteria. In some embodiments, a participant focus metric function may be suitable utilized in connection with multiple codes, e.g., by utilizing average hardware and network requirements, etc. In one particular example embodiment, the participant focus metric may be quantified as a value between 0 and 5, with a value of 0 indicating that the participant would provide a relatively low quality of experience for the communication session if the participant is utilized as the focus, and a value of 5 indicting that the participant would provide a relatively high quality of experience for the communication session if the participant is utilized as the focus. It will be appreciated that various different scales may be utilized for quantifying the participant focus metric.

Figure 7:
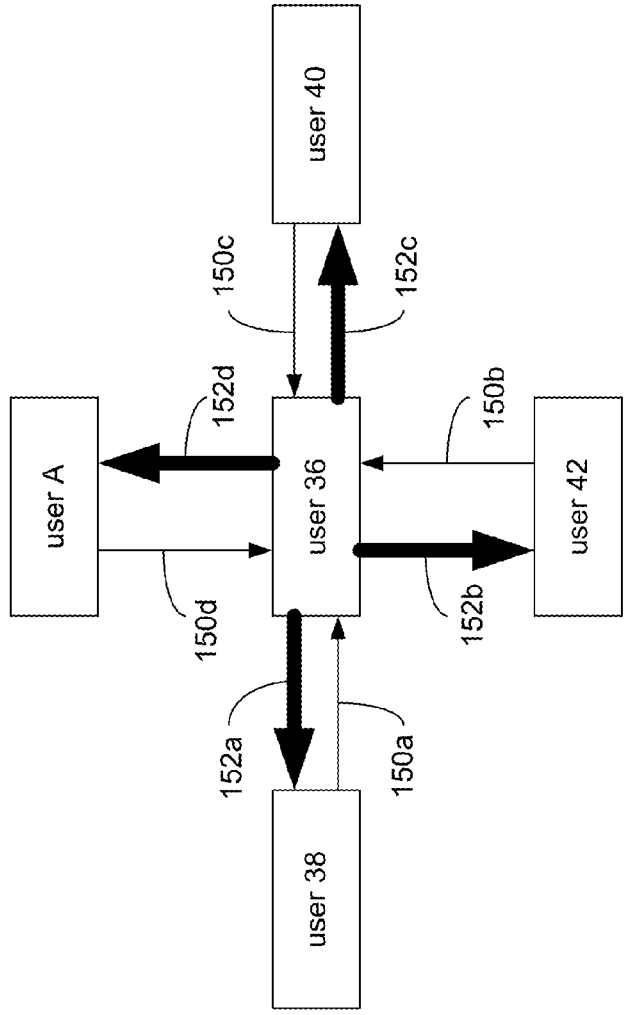
FIG. 7 diagrammatically depicts a communication session architecture arrangement provided by the quality of experience process of FIG. 1, according to an example embodiment.

For example, and referring also to FIG. 7, quality of experience process 10 may determine 100 a participant focus score (e.g., "focus score") for each participant of the communication session. As described above, the participant focus score for each participant of the communication session may be determined 100 based upon, at least in part, analyzed network conditions and hardware capacities associated with each of the plurality of participants of the communication session. In the illustrated example of FIG. 7, user 36 may have a determined 100 participant focus score of 4, user 38 may have a determined 100 participant focus score of 3.6, user 40 may have a determined 100 participant focus score of 2.5, user 42 may have a determined 100 participant focus score of 3, and user A may have a determined 100 participant focus score of 2. In an embodiment, quality of experience process 10 may determine 100 the participant focus score for each participant as each respective participant joins the communication session, once all of the participants have joined the communication session, and/or at one or more times during the course of the communication session.

Quality of experience process 10 may also identify 102 one of the plurality of participants of the communication session (i.e., a computing device associated with one of the plurality of participants of the communication session) as having sufficient capacity to support the communication session based upon, at least in part, the participant focus metric for each of the plurality of participants of the communication session. As generally described above, a sufficient capacity to support the communication session may include network conditions and/or hardware capacities that may allow the participant to act as the focus for the communication session while achieving a satisfactory quality of experience for the participants of the communication session. In an example embodiment, quality of experience process 10 may identify 102 one of the plurality of participants of the communication session as having sufficient capacity to support the communication session as being the participant having the highest determined 100 participant focus metric. In such an embodiment, in the illustrative example shown in FIG. 7, user 36 may be identified 102 as having sufficient capacity to support the communication session (e.g., by virtue of having the highest participant focus score).

In an embodiment, identifying 102 one of the plurality of participants of the communication session as having a sufficient capacity to support the communication session may include identifying one of the plurality of participants as having a participant focus metric greater than a threshold participant focus metric. For example, a threshold participant focus score may be determined (e.g., based upon, at least in part, system preferences, user settings, administrator rules, etc.) may be determined that may, for example, be expected to provide a satisfactory quality of experience associated with the communication session. As such, any participant having a participant focus score greater than the threshold (which may include greater than, or equal to, the threshold in some embodiments) may be considered to have a sufficient capacity to support the communication session at a satisfactory quality of experience. For example, and with continued reference to the illustrative example of FIG. 7, a threshold participant focus score of 2.9 may be defined. Accordingly, each of user 36, user 38 and user 42 may be identified 102 as having sufficient capacity to support the communication session by virtue of having a participant focus score greater than 2.9 (i.e., a participant focus score of 3 or greater). In some embodiments, while any participant having a participant focus score greater than the threshold may be considered capable of supporting the communication session at a satisfactory quality of experience, it may be the case that perceptible differences in quality of experience may be realized based upon relatively higher or relatively lower participant focus scores that are greater than the threshold.

Quality of experience process 10 may also select 104 the one of the plurality of participants having a sufficient capacity to support the communication session as a selected focus for the communication session. For example, in an embodiment in which one of the plurality of participants may be identified as having sufficient capacity to support the communication session based upon having the highest participant focus score, the participant having the highest participant focus score may be selected 104 as the selected focus for the communication session. In an embodiment in which identifying 102 one of the plurality of participants of the communication session as having a sufficient capacity to support the communication session may include identifying one of the plurality of participants as having a participant focus metric greater than a threshold participant focus metric, one of the participants having a participant focus score greater than threshold may be selected 104 as the selected focus for the communication session. In an embodiment in which two or more participants have a participant focus greater than the threshold, various mechanisms may be utilized for selecting one of the participants as the selected focus for the communication session. For example, in an embodiment the participant having the highest participants focus score may be selected 104. In another embodiment, one of several participants having a participant focus score greater than the threshold may be selected based upon a role of the participant in the communication session. For example, if the initiator or moderator of the communication sessions has a participant focus score greater than the threshold, the initiator or moderator may be selected 104 as the selected focus for the communication session. Various other considerations may be utilized for selecting 104 one of the participants identified 102 as having sufficient capacity to support the communication session as the selected focus, such as position within an organization (e.g., within a company or other organization), job title, geographic location, geographic proximity to one or more other participants, and/or various other considerations.

Quality of experience process 10 may further adaptively implement 106 a centralized communication session architecture utilizing the selected focus. For example, and with continued reference to FIG. 7, user 36 may be selected 104 as the selected focus for the communication session, e.g., based upon user 36 having the highest participant focus score. Based upon the selection 104 of user 36 as the selected focus for the communication session, quality of experience process 10 may implement 106 a centralized communication session architecture utilizing user 36 as the focus for the communication session. Accordingly, and as generally discussed above, user 36 (e.g., a computing device utilized by and/or associated with user 36) may receive media streams (e.g., media streams 150*a*, 150*b*, 150*c*, 150*d*) from each of the other participants of the communication session (e.g., as generally shown using thin arrows). Further, user 36 may decode and mix the media stream from each of the other participants (as well as any media stream generated on the computing device utilized by user 36 for participating in the communication session) and may encode the mixed media stream. User 36 may further distribute (e.g., transmit) the mixed media stream (e.g., mixed media streams 152*a*, 152*b*, 152*c*, 152*d*) to each of the participants of the communication session. Utilizing user 36 as the selected focus for the communication session may result in each participant of the communication session realizing a perceived quality of experience, e.g., which may be quantified as a mean opinion score (e.g., MOS) that may quantify the perceived quality of experience for each participant on a scale from one to five. For example, in the illustrated example of FIG. 7, with user 36, having a participant focus score of 4, utilized as the selected focus for the communication session, user 36 may have a perceived average MOS of 4.3, user 38 may have a perceived average MOS of 4, user 40 may have a perceived average MOS of 3.7, user 42 may have a perceived average MOS of 3.8, and user A may have a perceived average MOS of 4.1.

In an embodiment, quality of experience process 10 may initially determine 100 a participant focus metric for one or more of the participants of the communication session, e.g., when the communication session is initiated and/or when each of the plurality of participants joins the communication session. Further, a participant may be selected 104 as the selected focus for the communication session based upon the initially determined 100 participant focus metrics for each of the plurality of participants. In some situations, the ability of one or more of the participants to support the communication session may vary over time, e.g., which may be reflected in the participant focus metric associated with one or more of the plurality of participants changing over time. In an embodiment, quality of experience process 10 may adaptively reevaluate the ability of each of the participants to support the communication session and/or adaptively reevaluate the most appropriate participant to act as the focus for the communication session.

Figure 8:
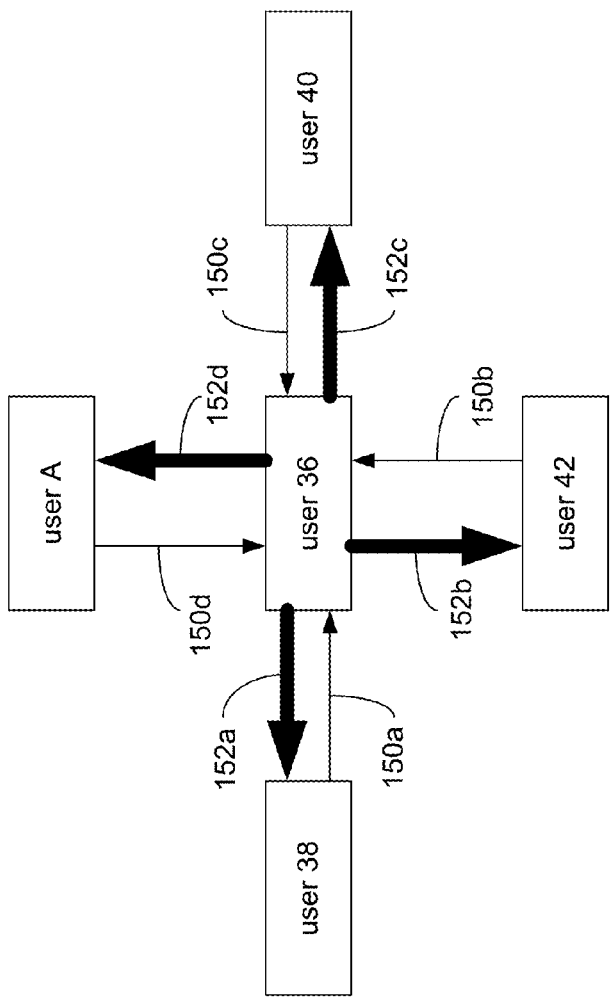
FIG. 8 diagrammatically depicts a communication session architecture arrangement provided by the quality of experience process of FIG. 1, according to an example embodiment.

For example, and referring to FIG. 8, at some point in time after user 36 had been selected 104 as the selected focus for the communication session, quality of experience process 10 may determine 100 the participant focus metric for one or more of the plurality of the participants of the communication session. Consistent with the illustrated example embodiment, at the illustrated point in time quality of experience process 10 may determine 100 a participant focus score of 2.2 for user 36 (e.g., as compared to the previously determined participant focus score of 4 for user 36). Similarly, quality of experience process 10 may determine 100 a participant focus score of 3.6 for user 38, a participant focus score of 2.5 for user 40, a participant focus score of 3 for user 42, and a participant focus score of 2 for user A. Further, as depicted the decrease in the participant focus score for user 36 (e.g., who may currently be the focus for the communication session) may result in a decrease in the average MOS for each participant of the communication session (e.g., as a result of user 36's diminished capacity to support the communication session as the selected focus for the communication session). While in the illustrated embodiment each of the participants may experience a decrease in the MOS for the communication sessions, in other embodiments fewer than all of the participants may experience such a decrease in the MOS for the communication session.

In some embodiments, the participant focus metric may be determined 100 (and/or re-determined 100) at some point in time while the communication session is in progress and/or ongoing. In some embodiments, quality of experience process 10 may determine 100 (and/or re-determine) the participant focus metric for all of the plurality of participants, and/or for only a portion of the plurality of participants. For example, in an embodiment, determining 100 the participant focus metric may include periodically determining 100 the participant focus metric for each of the plurality of participants. For example, quality of experience process 10 may determine 100 the participant focus metric for one or more of the plurality of participants at predefined time intervals (e.g., which may be defined by system settings, user selection, etc.). Further, in some embodiments, quality of experience process 10 may determine 100 the participant focus metric for one or more of the plurality of participants in response to detecting a change in the MOS for one or more of the participants. In one example, quality of experience process 10 may determine 100 the participant focus metric for one or more of the plurality of participants in response to a change in the MOS for a portion of the plurality of participants. In an embodiment, the portion of participants (e.g., a defined number of the participants, a defined percentage of the participants, etc.) may be based upon, at least in part, a system setting and/or user preference (e.g., which may be defined by a communication session moderator, a system administrator, or another individual).

As discussed above, the capacity of an individual (e.g., of the computing device associated with the individual) to perform as the focus for the communication session may be, in part, based upon the network conditions or characteristics experienced by the individual. Accordingly, changes in network characteristics and/or conditions may result in a change in the capability of one or more participants to act as the focus for the communication session. In an embodiment, quality of experience process 10 may identify 110 a change in a network characteristic associated with one or more of the plurality of participants. The participant focus metric for each of the plurality of participants may be determined 100 based upon, at least in part, the change in the network characteristic associated with the one or more of the plurality of participants. For example, and with continued reference to FIG. 8, quality of experience process 10 may identify 110 a change in a network characteristic, such as a decrease in bandwidth, etc., associated with user 36. In response to the identified 110 decrease in bandwidth associated with user 36, quality of experience process 10 may determine 100 a participant focus metric associated with user 36, and/or associated with one or more other participants in the communication session. While identifying 110 changes in network conditions associated with the selected 104 focus for the communication session may be relevant, e.g., to determine a decrease in the capacity of the selected focus to support the communication session, changes in network conditions associated with other participants may also be relevant, e.g., as indicating an improved capacity of another participant to act as the focus for the communication session. As such, quality of experience process 10 may identify 110 changes in network characteristics associated with one, or more than one, participants of the communication session.

As generally discussed above, the capacity for participants to support the communications session as the focus for the communication session may be based upon, at least in part, the hardware capacities associated with the participants of the communication session. Accordingly, changes in hardware capacities may result in a change in the capability of one or more participants to act as the focus for the communication session. In an embodiment, quality of experience process 10 may identify 112 a change in hardware capacity associated with one or more of the plurality of participants. The participant focus metric may be determined 100 for each of the plurality of participants based upon, at least in part, the change in hardware capacity associated with the one or more of the plurality of participants. For example, and with continued reference to FIG. 8, quality of experience process 10 may identify 112 a change in hardware capacity, e.g., such as a decrease in available RAM, etc., associated with user 36. In response to the identified 112 decrease in available RAM associated with user 36, quality of experience process 10 may determine 100 a participant focus metric associated with user 36, and/or associated with one or more other participants in the communication session. While identifying 112 changes in hardware capacities associated with the selected 104 focus for the communication session may be relevant, e.g., to determine a decrease in the capacity of the selected focus to support the communication session, changes in hardware capacities associated with other participants may also be relevant, e.g., as indicating an improved capacity of another participant to act as the focus for the communication session. As such, quality of experience process 10 may identify 112 changes in hardware capacities associated with one, or more than one, participants of the communication session.

In an embodiment, quality of experience process 10 may determine 100 the participant focus metric associated with one or more participants of the communication session in response to identifying 110, 112 changes in network conditions and/or hardware capacities of one or more participants of the communication session. In some embodiments, quality of experience process 10 may analyze hardware capacities and/or network conditions associated with one or more of the participants in the communication session in response to determining a change in MOS associated with one, a portion, or all of the participants in the communication session.

In an embodiment in which quality of experience process 10 may determine 100 (and/or re-determine 100) the participant focus metric for one or more of the participants while the communication session is in progress and/or ongoing, quality of experience process 10 may determine 114 a changed participant focus metric associated with the selected focus. For example, and as discussed with reference to FIG. 8, quality of experience process may subsequently determine 100 a participant focus metric for the plurality of participants in the communication session. Further, quality of experience process 10 may determine 114 a changed participant focus metric associated with user 36. For example, in the illustrated example quality of experience process 10 may determine 114 a changed participant focus metric of 2.2, which may be a decrease from the previously determined participant focus metric of 4. In an embodiment, the identified 114 changed participant focus metric may indicate that the current focus for the communication session may not have a sufficient capacity to support the communication session. Additionally/alternatively, the changed participant focus metric may be below the defined threshold for supporting the communication session and/or may no longer be the highest participant focus metric (depending upon the paradigm utilized for selecting 104 a participant as the selected focus for the communication session). As such, the current focus may not long be an appropriate, desirable, and/or best participant to act as the focus for the communication session.

In an embodiment in which a selected 104 focus for implementing 106 the centralized communication session architecture had previously been established, the selected 104 focus may subsequently be changed, e.g., in response to the original focus leaving the communication session and/or in response to another participant being determined to be a more suitable and/or preferable focus (e.g., which may be based upon, at in part, identified 110, 112 changes in network conditions and/or hardware capacities, changes in participantship in the communication session, etc.). Another participant may be determined (e.g., based upon, at least in part a determined 114 changed participant focus metric, or the like) to be a more suitable and/or preferable focus. The other participants maybe determined to be a more suitable and/or preferable focus, for example, if the other participant is determined to be capable of providing a higher quality of experience for the communication session when the other participant is utilized as the focus for the communication session. In some embodiments, a participant may be determined to be capable of providing a higher quality of experience for the communication session based upon, at least in part, the participant focus metric associated with the other participant. The communication session may be adaptively switched 116 to a different participant of the communication session as a new selected focus for implementing the centralized communication session architecture for the communication session.

Figure 9:
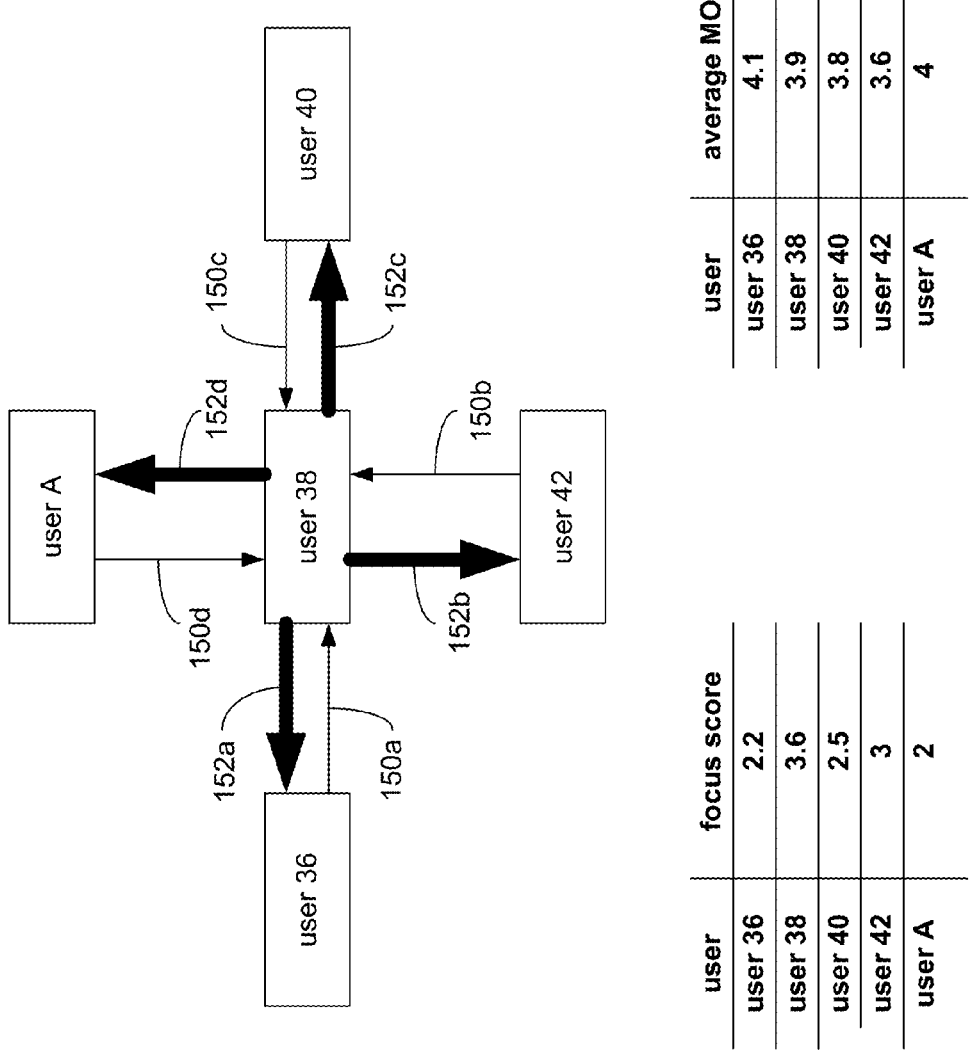
FIG. 9 diagrammatically depicts a communication session architecture arrangement provided by the quality of experience process of FIG. 1, according to an example embodiment.

For example, and referring also to FIG. 9, in response to, determining 114 a changed participant focus metric associated with user 36, user 38 (and/or one or more other participants) may be identified 102 as having sufficient capacity to support the communication session. In the illustrated example embodiment, quality of experience process 10 may select 104 user 38 as a new selected focus for the communication session. Further, quality of experience process 10 may adaptively switch to user 38 as the focus for implementing the centralized communication session architecture for the communication session. Consistent with the illustrated embodiment, the MOS for the various participants of the communication session may increase, e.g., as a result of user 38's greater capacity to support the communication session. In some situations, even if the current focus of the communication session may not be the best participant to act as the focus, the current focus may still be suitable enough to not warrant changing the focus for the communication session at that time. For example, an anticipated increase in the quality of experience associated with adaptively 116 switching to a different focus may be comparatively minor compared to the expense associated with switching the focus.

Figure 10:
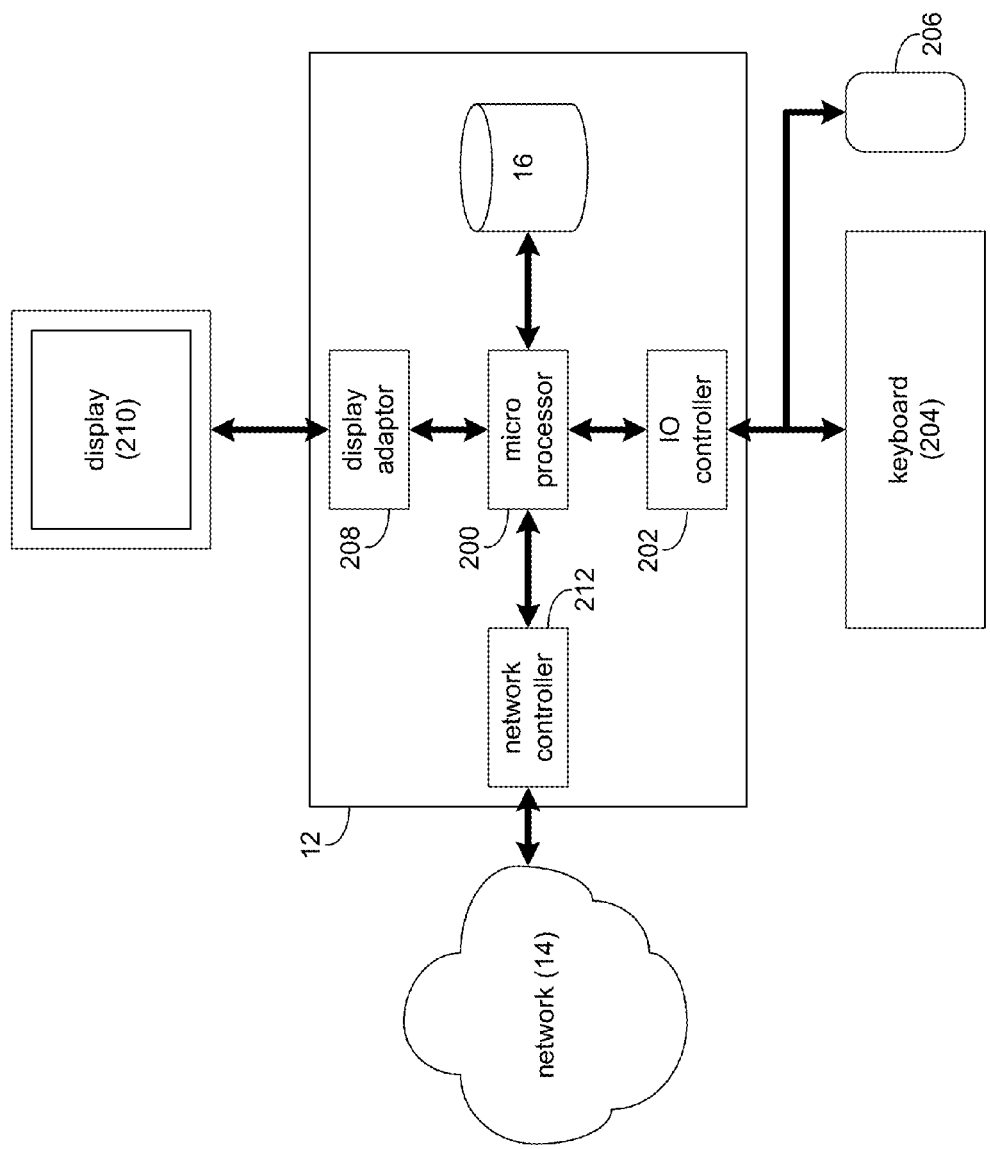
FIG. 10 diagrammatically depicts a computing device that may execute, in whole or in part, the quality of experience process of FIG. 1, according to an example embodiment.

Referring also to FIG. 10, there is shown a diagrammatic view of computing system 12. While computing system 12 is shown in this figure, this is for illustrative purposes only and is not intended to be a limitation of this disclosure, as other configuration are possible. For example, any computing device capable of executing, in whole or in part, quality of experience process 10 may be substituted for computing device 12 within FIG. 10, examples of which may include but are not limited to client electronic devices 28, 30, 32, 34.

Computing system 12 may include microprocessor 200 configured to e.g., process data and execute instructions/code for quality of experience process 10. Microprocessor 200 may be coupled to storage device 16. As discussed above, examples of storage device 16 may include but are not limited to: a hard disk drive; a tape drive; an optical drive; a RAID device; an NAS device, a Storage Area Network, a random access memory (RAM); a read-only memory (ROM); and all forms of flash memory storage devices. 10 controller 202 may be configured to couple microprocessor 200 with various devices, such as keyboard 204, mouse 206, USB ports (not shown), and printer ports (not shown). Display adaptor 208 may be configured to couple display 210 (e.g., a CRT or LCD monitor) with microprocessor 200, while network adapter 212 (e.g., an Ethernet adapter) may be configured to couple microprocessor 200 to network 14 (e.g., the Internet or a local area network).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   analyzing, by a computing device, network conditions associated with each of a plurality of participants of a communication session for conducting bidirectional communications between the plurality of participants of the communication session and hardware capacities associated with each of the plurality of participants of the communication session;
   determining, in response to a change in a quantified perceived quality of experience associated with one or more participants of the plurality of participants, a participant focus metric for each of the plurality of participants of a the communication session based upon, at least in part, the network conditions and hardware capacities associated with each of the plurality of participants of the communication session, wherein the participant focus metric is a combined score of the network conditions and hardware capacities associated with each of the plurality of participants of the communication session, wherein the participant focus metric is a function that is specific to one or more individual codecs utilized for the communication session, including at least one of millions of instructions per second (MIPS) for processing the one or more individual codecs utilized for the communication session and RAM requirements for processing the one or more individual codecs utilized for the communication session;
   identifying one of the plurality of participants of the communication session as having sufficient capacity to support the communication session based upon, at least in part, the participant focus metric for each of the plurality of participants of the communication session, wherein the sufficient capacity to support the communication session includes sufficient capacity to achieve a best available quantified perceived quality of experience for each of the plurality of participants of the communication session;
   selecting the one of the plurality of participants having a sufficient capacity to support the communication session as a selected focus for the communication session; and
   adaptively implementing a centralized communication session architecture utilizing the selected focus.

2. The computer-implemented method of claim 1, wherein identifying one of the plurality of participants of the communication session as having a sufficient capacity to support the communication session includes identifying one of the plurality of participants as having a participant focus metric greater than a threshold participant focus metric.

3. The computer-implemented method of claim 1, wherein determining the participant focus metric includes periodically determining the participant focus metric for each of the plurality of participants.

4. The computer-implemented method of claim 1, further comprising:
   identifying a change in a network characteristic associated with one or more of the plurality of participants; and
   determining the participant focus metric based upon, at least in part, the change in the network characteristic associated with the one or more of the plurality of participants.

5. The computer-implemented method of claim 1, further comprising:
   identifying a change in hardware capacity associated with one or more of the plurality of participants; and
   determining the participant focus metric based upon, at least in part, the change in hardware capacity associated with the one or more of the plurality of participants.

6. The computer-implemented method of claim 1, further comprising:
   determining a changed participant focus metric associated with the selected focus; and; and
   adaptively switching to a different participant of the communication session as a new selected focus for implementing the centralized communication session architecture for the communication session.

7. The computer-implemented method of claim 1, wherein the participant focus metric is a function of millions of instructions per second (MIPS) required for processing media streams associated with the communication session.

* * * * *